(12) United States Patent
Mohr et al.

(10) Patent No.: US 11,913,495 B2
(45) Date of Patent: Feb. 27, 2024

(54) BEARING AND/OR SEAL ASSEMBLY INCLUDING PERMEABLE BODY WITH FEATURES ENGINEERED TO FORM A DESIRED DISTRIBUTION PATTERN FOR A PRESSURIZED GAS CONVEYED THERETHROUGH

(71) Applicant: SIEMENS ENERGY, INC., Orlando, FL (US)

(72) Inventors: Byron L. Mohr, Olean, NY (US); Tristen Barnes, Olean, NY (US); Mark J. Kuzdzal, Allegany, NY (US); Christopher Guerra, Olean, NY (US); Harry Francis Miller, Allegany, NY (US)

(73) Assignee: Siemens Energy, Inc., Orlando, FL (US)

( * ) Notice: Subject to any disclaimer, the term of this patent is extended or adjusted under 35 U.S.C. 154(b) by 399 days.

(21) Appl. No.: 17/293,347

(22) PCT Filed: Nov. 20, 2018

(86) PCT No.: PCT/US2018/062033
§ 371 (c)(1),
(2) Date: May 12, 2021

(87) PCT Pub. No.: WO2020/106279
PCT Pub. Date: May 28, 2020

(65) Prior Publication Data
US 2022/0010837 A1 Jan. 13, 2022

(51) Int. Cl.
*F16C 32/06* (2006.01)
*F16C 33/12* (2006.01)
*F16C 33/14* (2006.01)

(52) U.S. Cl.
CPC ...... *F16C 32/0618* (2013.01); *F16C 32/0622* (2013.01); *F16C 32/0685* (2013.01);
(Continued)

(58) Field of Classification Search
CPC .............. F16C 32/0618; F16C 32/0622; F16C 32/0685; F16C 32/0692; F16C 33/128; F16C 33/145; F16C 2220/24
See application file for complete search history.

(56) References Cited

U.S. PATENT DOCUMENTS

| 4,847,962 A | 7/1989 | Puetz |
| 6,733,875 B1 | 5/2004 | Takano et al. |

(Continued)

FOREIGN PATENT DOCUMENTS

| CN | 101589242 A | 11/2009 |
| CN | 102292560 A | 12/2011 |

(Continued)

OTHER PUBLICATIONS

PCT International Search Report and Written Opinion of the International Searching Authority dated Aug. 30, 2019 corresponding to PCT Application No. PCT/US2018/062033 filed Nov. 20, 2018.

*Primary Examiner* — Gilbert Y Lee

(57) ABSTRACT

A bearing and/or seal assembly where pressurized gas (e.g., air) may be arranged to produce a contact-free bearing and/or seal is provided. The assembly includes a permeable body (12) including structural features (13) selectively engineered to convey a pressurized gas (Ps) from an inlet side (20) side of the permeable body to an outlet side (22) of the permeable body to form an annular film of the pressurized gas relative to the rotatable shaft. Disclosed embodiments may be produced by way of three-dimensional (3D) Printing/Additive Manufacturing (AM) technologies with practically no manufacturing variability; and may also cost-effectively and reliably benefit from the relatively complex (Continued)

geometries and the features and/or conduits that may be involved to, for example, form the desired distribution pattern or impart a desired directionality to the pressurized gas conveyed through the permeable body of the bearing and/or seal assembly.

18 Claims, 5 Drawing Sheets

(52) U.S. Cl.
CPC ........ *F16C 32/0692* (2013.01); *F16C 33/128* (2013.01); *F16C 33/145* (2013.01); *F16C 2220/24* (2013.01)

(56) References Cited

U.S. PATENT DOCUMENTS

| | | | |
|---|---|---|---|
| 7,429,132 | B1 | 9/2008 | Marussich |
| 10,001,166 | B2 | 6/2018 | Ertas et al. |
| 2010/0229717 | A1 | 9/2010 | Schubert |
| 2014/0286599 | A1 | 9/2014 | Devitt et al. |
| 2016/0024951 | A1* | 1/2016 | Sarawate ............... F01D 11/005 415/214.1 |
| 2016/0363165 | A1 | 12/2016 | Lin et al. |
| 2017/0157884 | A1 | 6/2017 | Wang et al. |
| 2020/0003309 | A1* | 1/2020 | Bamberg ............... F04D 29/526 |

FOREIGN PATENT DOCUMENTS

| | | |
|---|---|---|
| CN | 105736571 A | 7/2016 |
| CN | 106286595 A | 1/2017 |
| CN | 106321634 A | 1/2017 |
| CN | 107304787 A | 10/2017 |
| CN | 107448477 A | 12/2017 |
| DE | 951324 C | 10/1956 |
| DE | 8431800 U1 | 1/1990 |
| DE | 102006009268 A1 | 8/2007 |
| EP | 0121829 A1 | 10/1984 |
| EP | 0289886 A1 | 11/1988 |
| EP | 3366393 A1 | 8/2018 |
| GB | 2351533 A | 1/2001 |
| JP | S55115432 U | 8/1980 |
| WO | 2014079653 A1 | 5/2014 |

* cited by examiner

BEARING AND/OR SEAL ASSEMBLY INCLUDING PERMEABLE BODY WITH FEATURES ENGINEERED TO FORM A DESIRED DISTRIBUTION PATTERN FOR A PRESSURIZED GAS CONVEYED THERETHROUGH

FIELD OF THE INVENTION

Disclosed embodiments relate to bearings and/or seals, and, more particularly, to improved structural features in bearings and/or seals, where such structural features may be constructed by way of three-dimensional (3D) Printing/Additive Manufacturing (AM) technologies.

BACKGROUND OF THE INVENTION

Constructing effective and reliable bearings and/or seals, such as may be used in rotating machinery, has been a challenge essentially for as long as there has been such machinery. Non-limiting examples of industrial applications where bearings and/or seals may be involved include oil and gas, power generation (including energy storage like compressed air or pumped hydro storage), aero turbines, chemical processing, paper manufacturing, aeration and water purification, gas separation and other process industries. Within these industrial applications, non-limiting examples of machinery where bearings and/or seals may be involved may include pumps, compressors, turbines, generators, motors, turbo expanders, turbo chargers, mixers, refiners, etc.

As will be appreciated by one skilled in the art of air bearings, pressurized gas (e.g., air) may be arranged to produce a contact-free bearing and/or seal. The pressurized gas may be conveyed as a film of gas or may be conveyed by way of a plurality of jets to implement the contact-free bearing. For example, a stator and a rotor to which a body is attached can interact via the gaseous film. See U.S. Pat. No. 8,753,014 for an example of an air bearing for use as a seal.

BRIEF DESCRIPTION OF THE DRAWINGS

Disclosed embodiments are explained in the following description in view of the drawings that show.

DETAILED DESCRIPTION OF THE INVENTION

The present inventors have recognized that traditional manufacturing techniques may not be necessarily conducive to a cost-effective and/or realizable manufacture of disclosed embodiments of bearing and/or seal assemblies, as may include a permeable body having structural features selectively engineered to form a desired distribution pattern of a pressurized gas conveyed through the permeable body. For example, traditional manufacturing techniques tend to fall short from consistently limiting manufacturing variability; and may also fall short from cost-effectively and reliably producing the relatively complex geometries and miniaturized features and/or conduits that may be involved in such bearing and/or seal assemblies.

In view of this recognition, in certain non-limiting embodiments, the present inventors propose use of three-dimensional (3D) Printing/Additive Manufacturing (AM) technologies, such as laser sintering, selective laser melting (SLM), direct metal laser sintering (DMLS), electron beam sintering (EBS), electron beam melting (EBM), etc., that may be conducive to cost-effective fabrication of disclosed bearing and/or seal assemblies that may involve complex geometries and miniaturized features and/or conduits. For readers desirous of general background information in connection with 3D Printing/Additive Manufacturing (AM) technologies, see, for example, textbook titled "Additive Manufacturing Technologies, 3D Printing, Rapid Prototyping, and Direct Digital Manufacturing", by Gibson I., Stucker B., and Rosen D., 2010, published by Springer, which is incorporated herein by reference.

Figure 1:
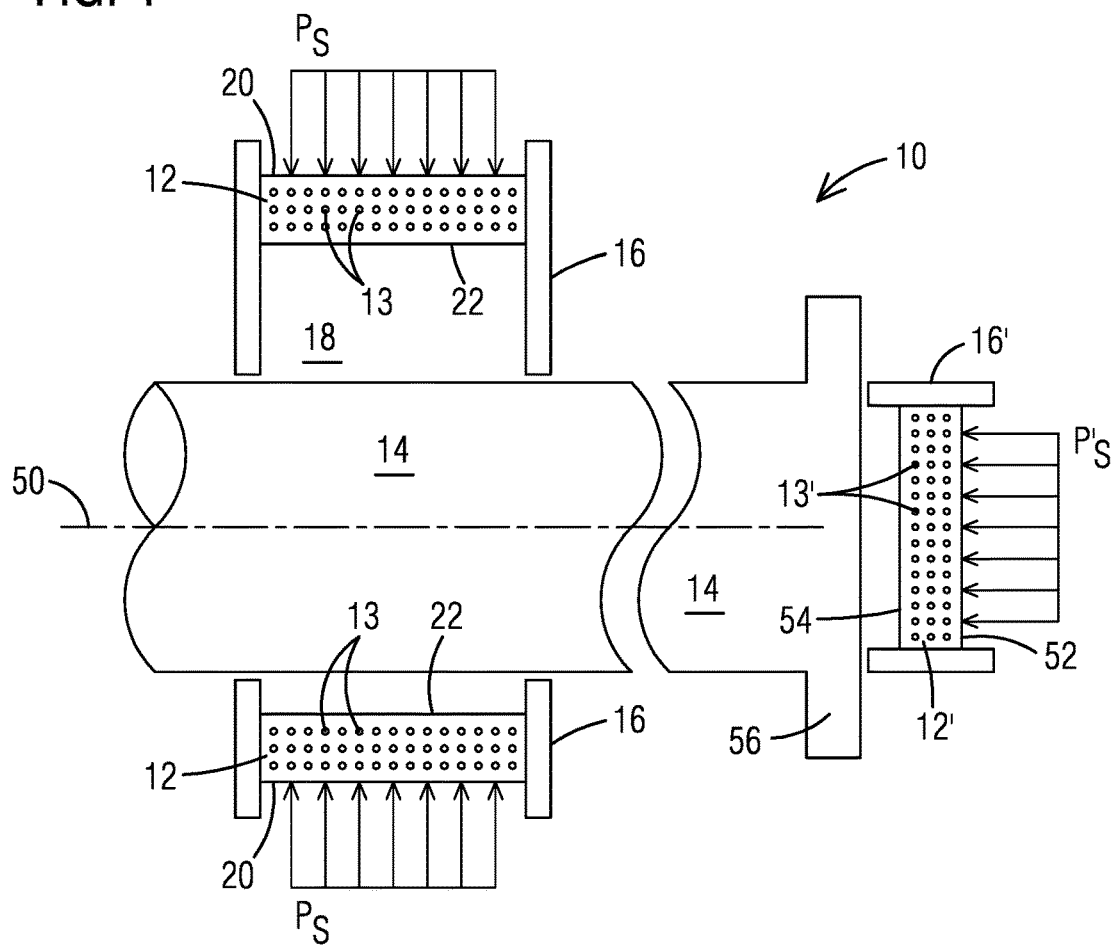
FIG. 1 is a cross-sectional view of one non-limiting embodiment of a disclosed bearing and/or seal assembly including a permeable body having structural features selectively engineered to form a desired distribution pattern of a pressurized gas conveyed through the permeable body.

FIG. 1 is a cross-sectional view of one non-limiting embodiment of a disclosed bearing and/or seal assembly 10 including a permeable body 12 having structural features 13 selectively engineered to form a desired distribution pattern of a pressurized gas conveyed through permeable body 12. The structural features 13 will be described in greater detail below in the context of the figures that follow FIG. 1. It will be appreciated that depending on the source of the pressurized gas, said gas bearings may be classified as aerostatic bearings, where the fluid is externally pressurized; or may be classified as aerodynamic bearings, where the fluid is pressurized by the relative velocity between the static and the moving surfaces interacting with the bearing. It will be appreciated that at least some of the concepts disclosed herein could be broadly applied regardless of the specific bearing classification.

In one non-limiting embodiment, an annular housing 16 of bearing and/or seal assembly 10 may be disposed concentric to a rotatable shaft 14. Annular housing 16 defines an annular cavity 18 about rotatable shaft 14. Permeable body 12 may be supported by annular housing 16. As noted above, the structural features within permeable body 12 may be selectively engineered to convey pressurized gas (schematically represented by arrows labeled Ps) from an inlet side 20 disposed at a radially-outward side of permeable body 12 to an outlet side 22 disposed at a radially-inward side of permeable body 12 to form an annular film of pressurized gas relative to rotatable shaft 14. It will be appreciated that the foregoing structural arrangement of permeable body 12 functions as a radial bearing arranged to radially support rotatable shaft 14. In this case the annular film of the pressurized gas conveyed by permeable body 12 defines an axis generally parallel to a rotor axis 50. The pressure forces formed by this annular film would be generally orthogonal to rotor axis 50.

In one non-limiting embodiment, a permeable body 12' may be arranged to function as a thrust bearing arranged to axially support rotatable shaft 14. In this case, the annular film of the pressurized gas conveyed by permeable body 12' defines an axis generally orthogonal to rotor axis 50 in lieu of parallel to rotor axis 50 as described above for the radial bearing. The pressure forces defined by this annular film would be generally parallel to rotor axis 50. In this embodiment, permeable body 12' may be supported by a housing 16' disposed at an axial end of rotatable shaft 14 and structural features 13' within permeable body 12' may be selectively engineered to convey pressurized gas (schematically represented by arrows labeled P's) from an inlet side 52 disposed at an axially-outward side of permeable body 12' to an outlet side 54 disposed at an axially-inward side of permeable body 12' to form the annular film of pressurized gas that may be arranged to act on a collar 56 of rotatable shaft 14. It will be appreciated that a similar type of thrust bearing arrangement may be arranged at an opposite axial end (not shown) of rotatable shaft 14.

In one non-limiting embodiment permeable body 12 comprises an additively manufactured structure. Without limitation, permeable body 12 may be made of graphite, carbon, silicon carbide, tungsten carbide, alumina, titanium, Inconel, babbitt metal, a ceramic-based material, a carbon fiber-epoxy composite material, a combination of two or more of said materials or basically any material, including powder-based materials, whose porosity and/or in-situ conduit formation can be controlled by way of AM technology.

Figure 2:
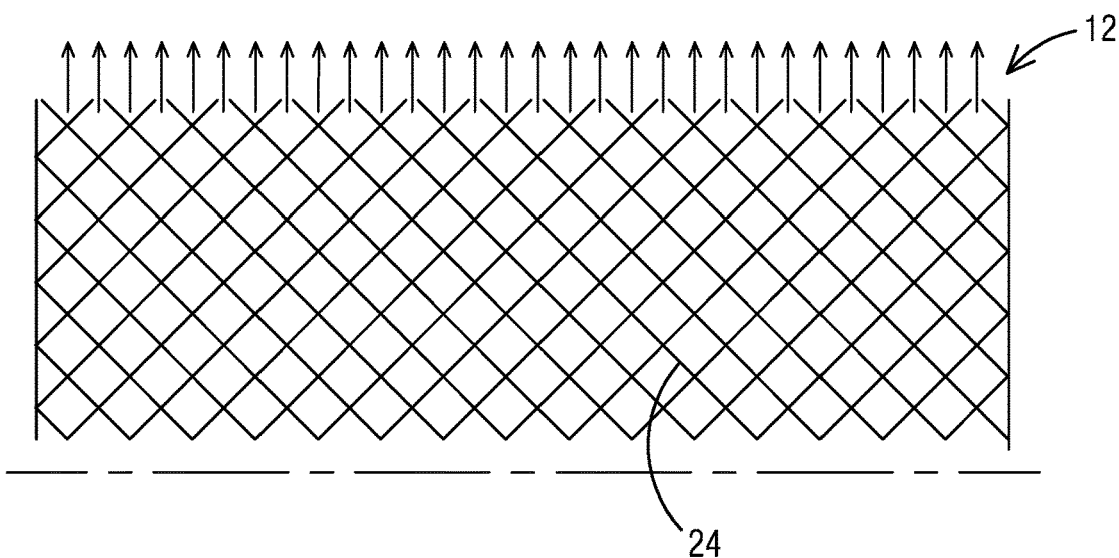
FIG. 2 is a cross-sectional view of one non-limiting embodiment of the permeable body, where the structural features may be arranged to form a lattice of structural features within the permeable body.

FIG. 2 is a cross-sectional view of one non-limiting embodiment of permeable body 12, where the structural features may be arranged to form a lattice 24 of structural features (e.g., an ordered (non-stochastic) array of cellular structures) within permeable body 12. Without limitation, the density distribution of lattice 24 may be optimized based on the needs of a given application. Lattice structures can be effectively implemented in the realm of AM for various reasons, such as without limitation: enabling the fabrication of a topology optimization solution with intermediate densities (as may be found in density based techniques); reducing part distortions, as their inherent porosity reduces residual stresses, and as a result require fewer supports (for example, support needs may be alleviated with inclusion of self-supporting unit cells; and improved design robustness. For readers desirous of further background information, see paper titled "Strategies For Functionally Graded Lattice Structures Derived Using Topology Optimisation For Additive Manufacturing" authored by A. Panesar, M. Abdi, D. Hickman and I. Ashcroft, ©2017 The Authors. Published by Elsevier B.V.

Figure 3:
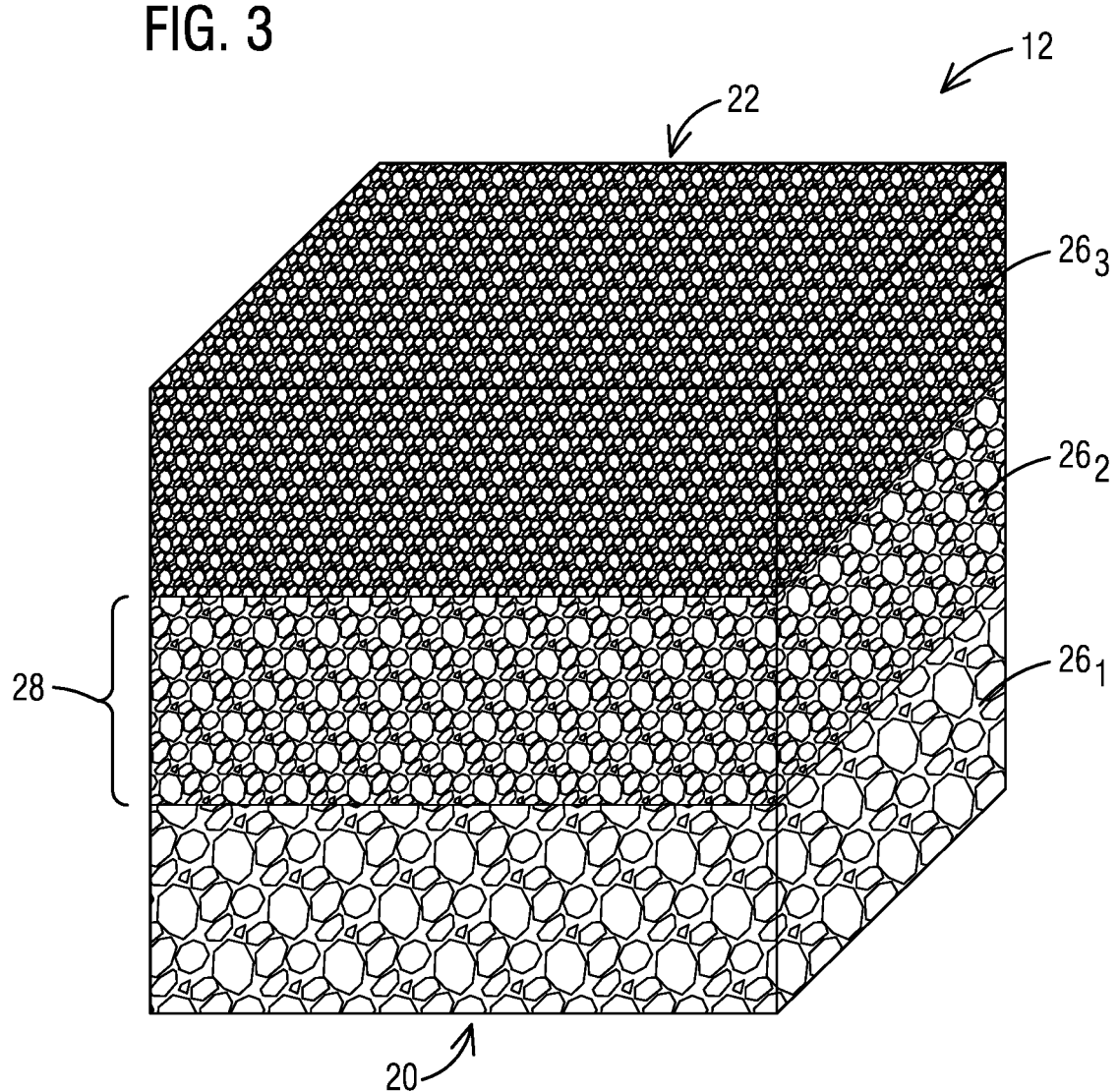
FIG. 3 is a cross-sectional view of one non-limiting embodiment of the permeable body, where the structural features may be arranged to form a metal foam structure comprising open cells within the permeable body.

FIG. 3 is a cross-sectional view of one non-limiting embodiment of permeable body 12, where the structural features may be arranged to form a metal foam structure comprising open cells 26 (e.g., stochastically distributed) within the permeable body. Without limitation, the open cells of the metal foam structure may be engineered to provide a varying porosity (between inlet side 20 and outlet side 22 of the permeable body. For example, open cells $26_1$—as may be disposed downstream from inlet side 20 and upstream of an intermediate region 28 of permeable body 12—may be engineered to have a relatively coarser porosity compared to open cells $26_2$, as may be disposed within intermediate region 28. In this example, open cells $26_3$—as may be disposed upstream from outlet side 22 and downstream of intermediate region 28 of permeable body 12—may have a relatively finer porosity compared to open cells $26_2$. This arrangement may be conducive to provide a gradual transition for a pressure gradient between inlet side 20 and outlet side 22 of the permeable body. For readers desirous of further background information regarding metal foams, see paper titled "Commercial Applications of Metal Foams: Their Properties and Production" by F. Garcia-Moreno, ©2016 by the Author. Licensee MDPI, Basel, Switzerland.

It will be appreciated that in a practical embodiment the side walls of the metal foam structure with the varying porosity between inlet side 20 and outlet side 22 of the permeable body would be constructed with a sufficiently fine porosity (or be appropriately encased) to preclude the possibility of leakage through the side walls of the metal foam structure.

Figure 4:
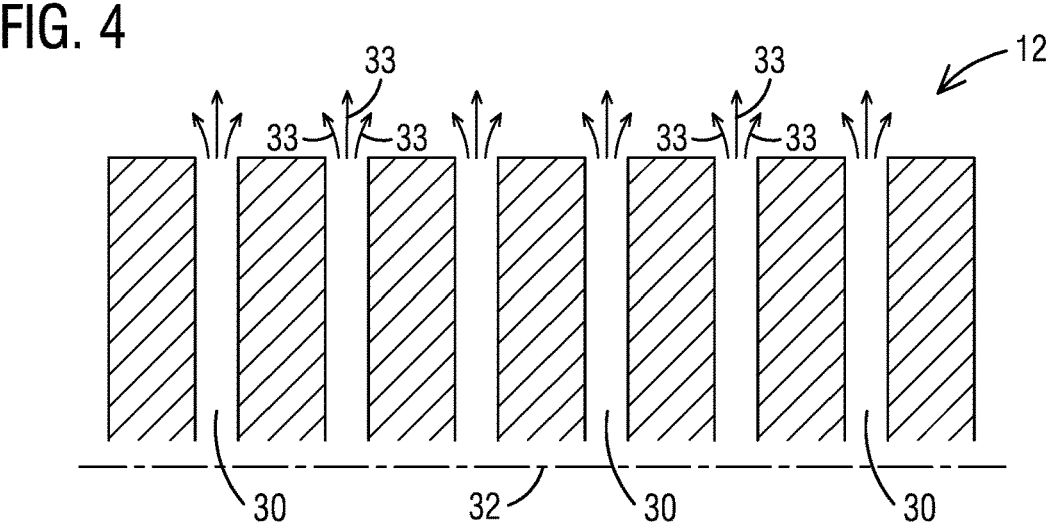
FIG. 4 is a cross-sectional view of one non-limiting embodiment of the permeable body, where the structural features may be arranged to form conduits uniformly distributed along a longitudinal axis of the permeable body.
Figure 5:
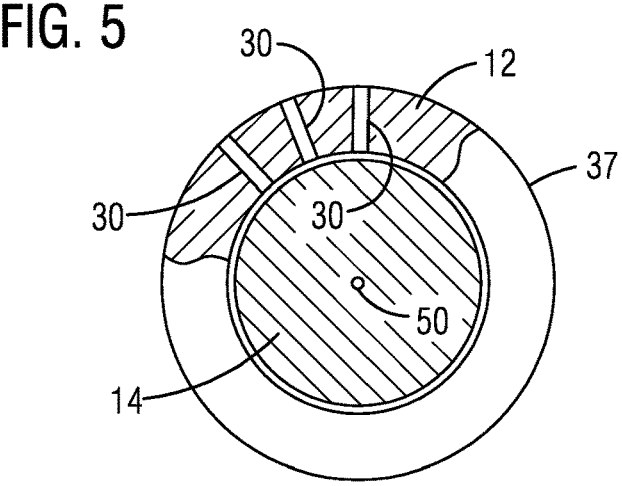
FIG. 5 is a cross-sectional view of one non-limiting embodiment of the permeable body, where the structural features may be arranged to form conduits uniformly distributed along a circumferential axis of the permeable body.

FIG. 4 is a cross-sectional view of one non-limiting embodiment of permeable body 12, where the structural features may be arranged to form conduits 30, which may be uniformly distributed along a longitudinal axis 32 of the permeable body. In this embodiment, the pressurized gas may be arranged to form a number of jets (schematically represented by arrows 33) uniformly distributed along longitudinal axis 32 of the permeable body. That is, the distribution pattern of the pressurized gas conveyed through permeable body would be substantially uniform. Additionally, as may be appreciated in FIG. 5, the structural features may be arranged to form conduits 30, which may be uniformly distributed along a circumferential axis 37 of the permeable body.

Figure 6:
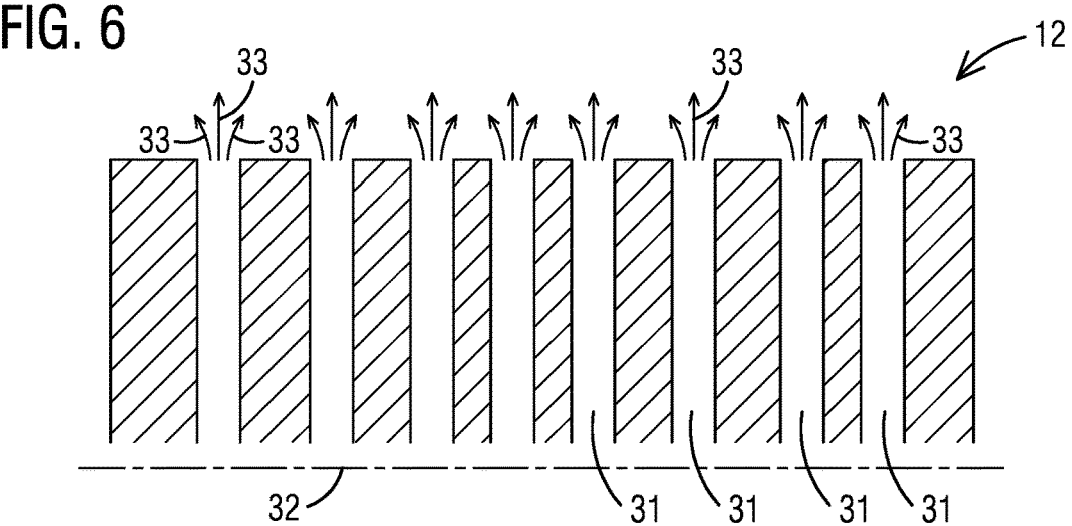
FIG. 6 is a cross-sectional view of one non-limiting embodiment of the permeable body, where the structural features may be arranged to form conduits non-uniformly distributed along the longitudinal axis of the permeable body.
Figure 7:
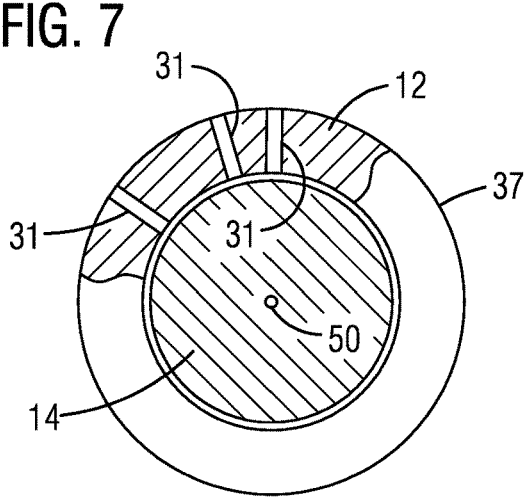
FIG. 7 is a cross-sectional view of one non-limiting embodiment of the permeable body, where the structural features may be arranged to form conduits non-uniformly distributed along the circumferential axis of the permeable body.

FIG. 6 is a cross-sectional view of one non-limiting embodiment of permeable body 12, where the structural features may be arranged to form conduits 31 which may be non-uniformly distributed along longitudinal axis 32 of the permeable body. In this embodiment, the jets 33 are non-uniformly distributed along longitudinal axis 32 of the permeable body. That is, the distribution pattern of the pressurized gas conveyed through permeable body is non-uniform. Additionally, as can be appreciated in FIG. 7, the structural features may be arranged to form conduits 31, which may be non-uniformly distributed along circumferential axis 37 of the permeable body.

The features described above in the context of FIGS. 4 through 7 may be combined based on the needs of a given application. Non-limiting options may be as follows: uniform axial distribution with uniform circumferential distribution; uniform axial distribution with non-uniform circumferential distribution; non-uniform axial distribution with uniform circumferential distribution; non-uniform axial distribution with non-uniform circumferential distribution.

Figure 9:
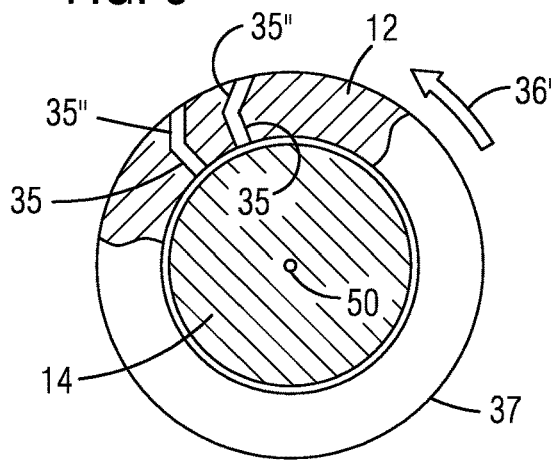
FIG. 9 is a cross-sectional view of one non-limiting embodiment of the permeable body, where the structural features may be arranged to form conduits including a radial-circumferential tilt arranged to jet the pressurized gas in a direction effective to offset a circumferential fluidic load that can develop during rotation of the shaft.
Figure 8:
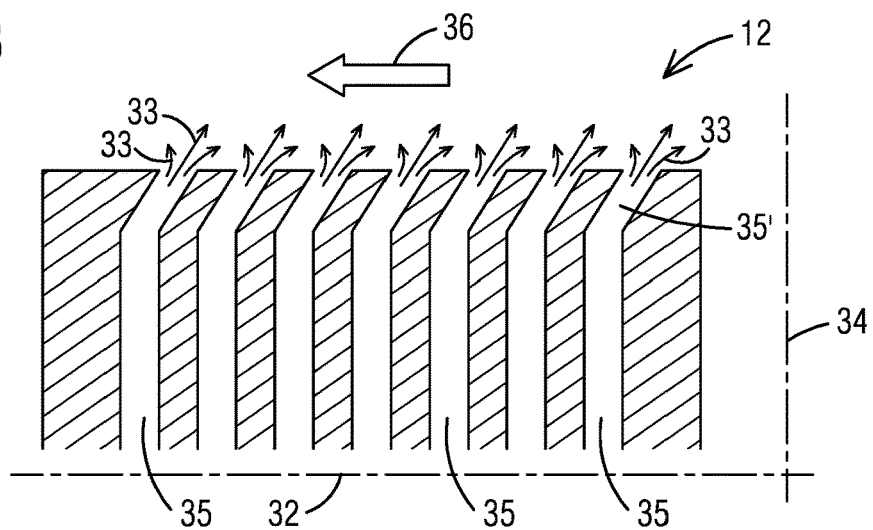
FIG. 8 is a cross-sectional view of one non-limiting embodiment of the permeable body, where the structural features may be arranged to form conduits including a radial-axial tilt arranged to jet the pressurized gas in a direction effective to offset an axial fluidic load that can develop during rotation of the shaft.

FIG. 8 is a cross-sectional view of one non-limiting embodiment of permeable body, where the structural features may be arranged to form conduits 35 including a conduit segment 35' having a radial-axial tilt (i.e., including vector components along longitudinal axis 32 and radial axis 34) arranged to jet the pressurized gas in a direction effective to offset an axial fluidic load (schematically represented by arrow 36). Additionally, as may be appreciated in FIG. 9, conduit segment 35" could have a radial-circumferential tilt (i.e., including vector components along circumferential axis 37 and radial axis 34) arranged to jet the pressurized gas in a direction effective to offset a circumferential fluidic load, (schematically represented by arrow 36'), such as circumferential gas velocity, that can develop during rotation of shaft 14 (FIG. 1). The features described above in the context of FIGS. 8 and 9 may be combined based on the needs of a given application.

As will be appreciated by one skilled in the art, the foregoing embodiments described above in the context of FIGS. 8 and 9 are non-limiting examples where the directionality of the jets of pressurized gas conveyed through the permeable body can be effectively controlled in the realm of AM. It will be further appreciated by one skilled in the art that the examples discussed above in the context of FIGS. 4 through 7 are non-limiting examples for selectively controlling the spatial density of jets of the pressurized gas conveyed through permeable body 12 while the examples discussed above in the context of FIGS. 2 and 3 are non-limiting examples for controlling the spatial density of the film of pressurized gas conveyed through a porous media, either of which can be effectively controlled by way of AM technologies.

Figure 10:
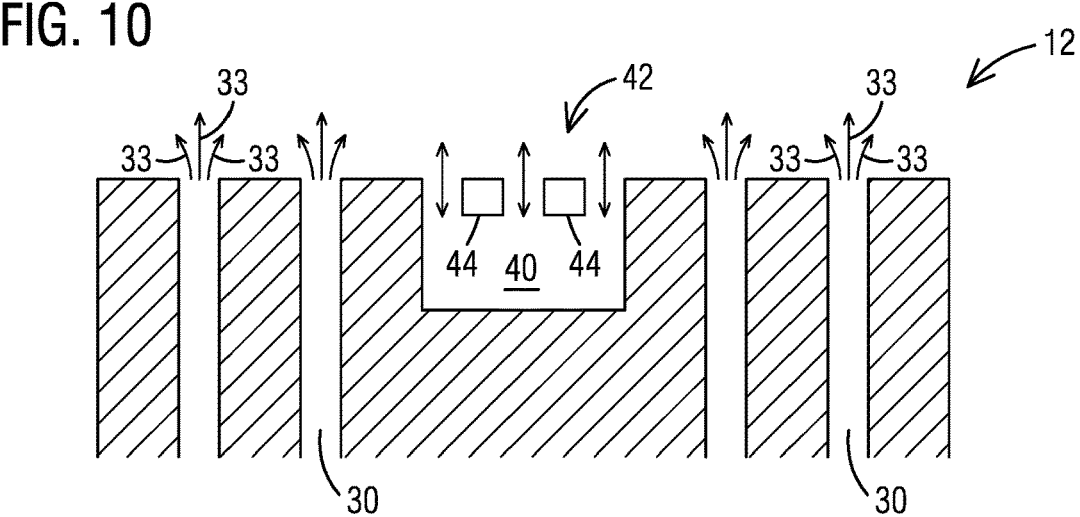
FIG. 10 is a cross-sectional view of one non-limiting embodiment of the permeable body including one embodiment of a damping cavity that may be arranged to damp shaft vibration.

FIG. 10 is a cross-sectional view of one non-limiting embodiment of permeable body 12 including one embodiment of a damping cavity 40. In one non-limiting embodiment, a side 42 of damping cavity (40), which is in fluid communication with annular cavity 18 may be defined by a gapped structure 44. As will be appreciated by one skilled in the art, to achieve stability at high rotational speed, aerostatic bearing and/or seal assembly 10 should have sufficient damping so that if a resonant mode is excited, for example, the amplitude of shaft vibration remains within an available clearance. In certain embodiments, motion of shaft 14 can induce a time-varying pressure in damping cavity 40 that may be appropriately arranged to dampen the shaft vibration.

Figure 11:
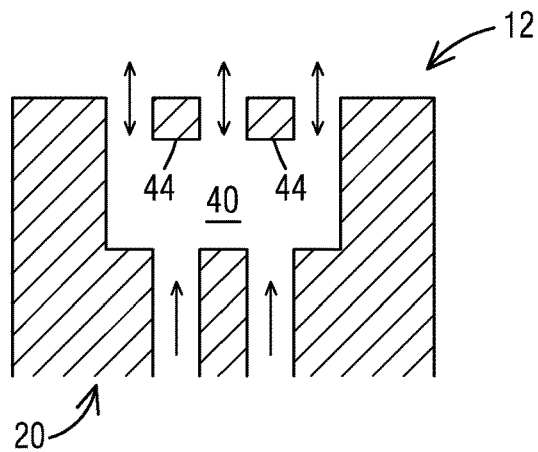
FIG. 11 is a cross-sectional view of one non-limiting embodiment of the permeable body including an alternative embodiment of the damping cavity.

FIG. 11 is a cross-sectional view of one non-limiting embodiment of permeable body 12 including an alternative embodiment of damping cavity 40, where damping cavity 40 is further in fluid communication with inlet side 20 of the permeable body to receive pressurized gas from inlet side 20 of permeable body 12.

Figure 12:
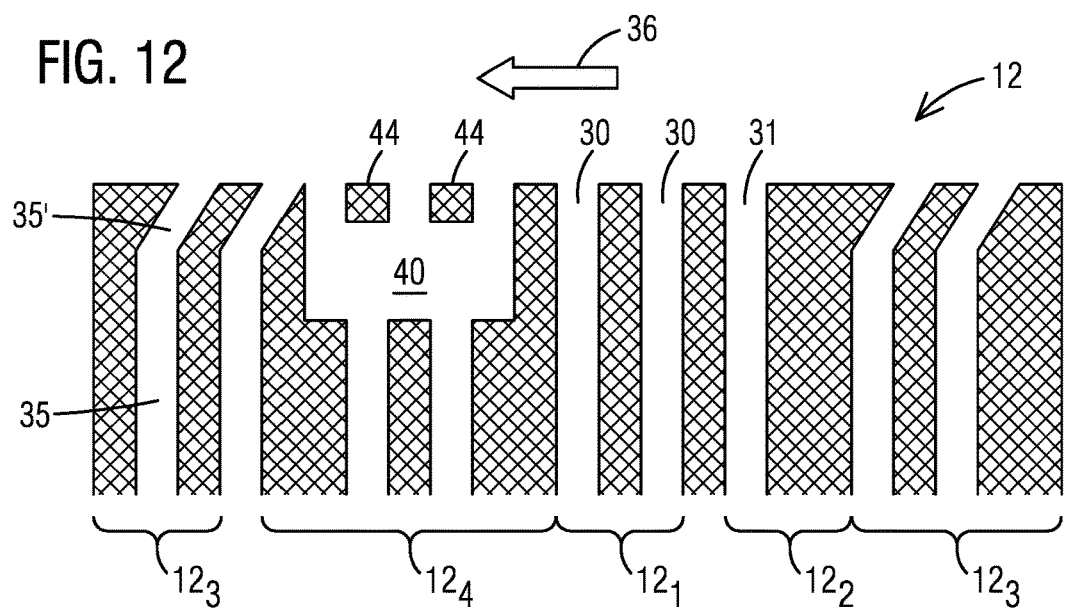
FIG. 12 is a cross-sectional view of one non-limiting embodiment of the permeable body including a plurality of sections integral with one another, where the structural features in at least some of such sections may be engineered to form different distribution patterns of the pressurized gas.

FIG. 12 is a cross-sectional view of one non-limiting embodiment of permeable body 12 that may include a plurality of sections, such as sections $12_1$, $12_2$, $12_3$, $12_4$ integral with one another, where the structural features in at least some of such sections may be engineered to form different distribution patterns of the pressurized gas.

Without limitation, at least a first section $12_1$ of the plurality of sections $12_1$, $12_2$, $12_3$, $12_4$ may include structural features selectively engineered to form conduits 30 uniformly distributed along the longitudinal axis of the permeable body and/or the circumferential axis of the permeable body, as discussed above in the context of FIGS. 4 and 5. At least a second section $12_2$ of the plurality of sections $12_1$, $12_2$, $12_3$, $12_4$ may include structural features selectively engineered to form conduits 31 non-uniformly distributed along the longitudinal axis and/or circumferential axis of the permeable body, as discussed above in the context of FIGS. 6 and 7. At least a third section $12_3$ of the plurality of sections $12_1$, $12_2$, $12_3$, $12_4$ may include structural features selectively engineered to form segment conduits 35' having a radial-axial and/or radial-circumferential tilt as discussed above in the context of FIGS. 8 and 9. Lastly, at least a fourth section $12_4$ of the plurality of sections $12_1$, $12_2$, $12_3$, $12_4$ may include a damping cavity 40, as discussed above in the context of FIG. 10 or 11.

Figure 13:
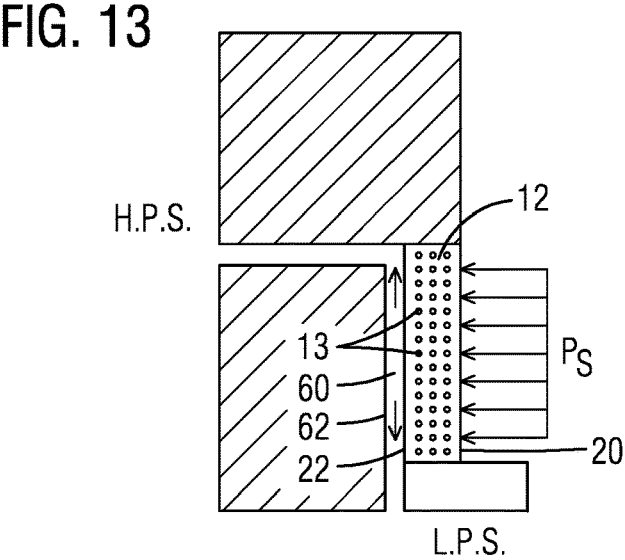
FIG. 13 is a schematic of one non-limiting embodiment of a disclosed bearing and/or seal assembly with the permeable body arranged to form a contactless seal between a high-pressure side and a low-pressure side.

FIG. 13 is a schematic of one non-limiting embodiment of a disclosed bearing and/or seal assembly with permeable body 12 arranged to form a contactless seal between a first pressure side (e.g., a high-pressure side, labelled H.P.S) and a second pressure side (e.g., a low-pressure side, labelled L.P.S). As discussed above, permeable body 12 is based on structural features 13 selectively engineered to convey a pressurized gas (Ps) from inlet side 20 of the permeable body to outlet side 22 of the permeable body to form a film of the pressurized gas arranged to impede fluid flow from the high-pressure side to the low-pressure side through a gap 60 between a seal face 62 and the outlet side 22 of permeable body 12. The high-pressure side may be in a plenum where a process gas may be subject to high levels of pressure (e.g., thousands of psi), and where often it would be undesirable for the process gas to leak to the surroundings.

In operation, disclosed embodiments of bearing and/or seal assemblies may be produced without limitation by way of AM technologies with practically no manufacturing variability; and may also cost-effectively and reliably benefit from the relatively complex geometries and the miniaturized features and/or conduits that may be necessary in such aerostatic bearing and/or seal assemblies to, for example, form a desired distribution pattern or impart a desired directionality to the pressurized gas conveyed through the permeable body of a disclosed bearing and/or seal assembly.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A bearing and/or seal assembly comprising:
   a rotatable shaft (14);
   an annular housing (16) disposed concentric to the rotatable shaft and defining an annular cavity (18) about the rotatable shaft; and
   a permeable body (12) supported by the annular housing, the permeable body
   based on structural features (13) selectively engineered to convey a pressurized gas (Ps) from an inlet side (20) disposed at a radially-outward side of the permeable body to an outlet side (22) disposed at a radially-inward side of the permeable body to form an annular film of the pressurized gas relative to the rotatable shaft, wherein a desired distribution pattern of the pressurized gas is formed based on the selectively engineered structural features, wherein the structural features are selectively engineered to form conduits (31) non-uniformly distributed along a longitudinal axis (32) and/or about a circumferential axis (37) of the permeable body for selectively controlling the spatial density of jets of the pressurized gas conveyed through the permeable body (12).

2. The bearing and/or seal assembly of claim 1, wherein the permeable body (12) comprises an additively manufactured structure.

3. The bearing and/or seal assembly of claim 1, wherein the structural features are selectively engineered to form a lattice (24) of structural features within the permeable body.

4. The bearing and/or seal assembly of claim 1, wherein the structural features are selectively engineered to form a metal foam structure comprising open cells (26) within the permeable body.

5. The bearing and/or seal assembly of claim 4, wherein the open cells ($26_1$, $26_2$, $26_3$) of the metal foam structure are engineered to provide a varying porosity between the inlet side (20) and the outlet side (22) of the permeable body.

6. The bearing and/or seal assembly of claim 1, wherein the structural features are selectively engineered to form conduits (30) uniformly distributed along a longitudinal axis (32) and/or about a circumferential axis (37) of the permeable body.

7. The bearing and/or seal assembly of claim 1, further comprising a damping cavity (40) in fluid communication with the annular cavity (18).

8. The bearing and/or seal assembly of claim 7, wherein a side (42) of the damping cavity in fluid communication with the annular cavity is defined by a gapped structure (44).

9. The bearing and/or seal assembly of claim 7, wherein the damping cavity (40) is further in fluid communication with the inlet side (20) of the permeable body to receive pressurized gas from the inlet side of the permeable body.

10. The bearing and/or seal assembly of claim 1, wherein the permeable body comprises a plurality of sections ($12_1$, $12_2$, $12_3$, $12_4$) integral with one another, wherein the structural features in at least some sections of the plurality of sections are engineered to form desired distribution patterns of the pressurized gas along a longitudinal axis and/or a circumferential axis of the permeable body.

11. The bearing and/or seal assembly of claim 10, wherein at least a first section ($12_1$) of the plurality of sections comprises structural features selectively engineered to form conduits (30) uniformly distributed along the longitudinal axis and/or about the circumferential axis of the permeable body.

12. The bearing and/or seal assembly of claim 10, wherein at least a second section ($12_2$) of the plurality of sections comprises structural features selectively engineered to form conduits (31) non-uniformly distributed along the longitudinal axis and/or about the circumferential axis of the permeable body.

13. The bearing and/or seal assembly of claim 10, wherein at least a third section ($12_3$) of the plurality of sections comprises structural features selectively engineered to form segment conduits (35) including 1) a conduit segment (35') having a radial-axial tilt disposed upstream of the outlet side (22) of the permeable body, the radial-axial tilt of the conduit segment arranged to jet the pressurized gas in a direction effective to offset an axial fluidic load that develops during rotation of the shaft; and/or
   further including 2) a conduit segment (35") having a radial-circumferential tilt disposed upstream of the outlet side (22) of the permeable body, the radial-circumferential tilt of
   the conduit segment arranged to jet the pressurized gas in a direction effective to offset a circumferential fluidic load that develops during rotation of the shaft.

14. The bearing and/or seal assembly of claim 10, wherein at least one section ($12_4$) of the plurality of sections comprises a damping cavity (40) in fluid communication with the annular cavity (18) through a gapped structure (44).

15. The bearing and/or seal assembly of claim 14, wherein the damping cavity (40) is further in fluid communication with the inlet side (20) of the permeable body to receive pressurized gas from the inlet side of the permeable body.

16. The bearing and/or seal assembly of claim 1, wherein the permeable body comprises a material selected from the group consisting of graphite, carbon, silicon carbide, tungsten carbide, alumina, titanium, Inconel, Babbitt metal, a ceramic-based material, a carbon fiber-epoxy composite material and a combination of two or more of said materials.

17. The bearing and/or seal assembly of claim 1, further comprising a permeable body (12') supported by a housing (16') disposed at an axial end of rotatable shaft 14, wherein structural features (13') within permeable body (12') are selectively engineered to convey pressurized gas from an inlet side (52) disposed at an axially-outward side of permeable body (12)' to an outlet side (54) disposed at an axially-inward side of permeable body (12') to form an annular film of pressurized gas arranged to act on a collar 56 of rotatable shaft 14.

18. A bearing and/or seal assembly comprising:
   a rotatable shaft (14);
   an annular housing (16) disposed concentric to the rotatable shaft and defining an annular cavity (18) about the rotatable shaft; and
   a permeable body (12) supported by the annular housing, the permeable body
   based on structural features (13) selectively engineered to convey a pressurized gas (Ps) from an inlet side (20) disposed at a radially-outward side of the permeable body to an outlet side (22) disposed at a radially-inward side of the permeable body to form an annular film of the pressurized gas relative to the rotatable shaft, wherein a desired distribution pattern of the pressurized gas is formed based on the selectively engineered structural features; and
   wherein the structural features are selectively engineered to form conduits (35) including 1) a conduit segment (35') having a radial-axial tilt disposed upstream of the outlet side (22) of the permeable body, the radial-axial tilt of the conduit segment arranged to jet the pressurized gas in a direction effective to offset an axial fluidic load (36) that develops during rotation of the shaft;

and/or further including 2) a conduit segment (35") having a radial-circumferential tilt disposed upstream of the outlet side (22) of the permeable body, the radial-circumferential tilt of the conduit segment arranged to jet the pressurized gas in a direction effective to offset a circumferential fluidic load (36') that develops during rotation of the shaft.

\* \* \* \* \*